May 20, 1952 — G. C. ELLERBECK — 2,597,463
AUXILIARY TENS-TRANSFER MECHANISM
Filed June 29, 1951 — 7 Sheets-Sheet 4
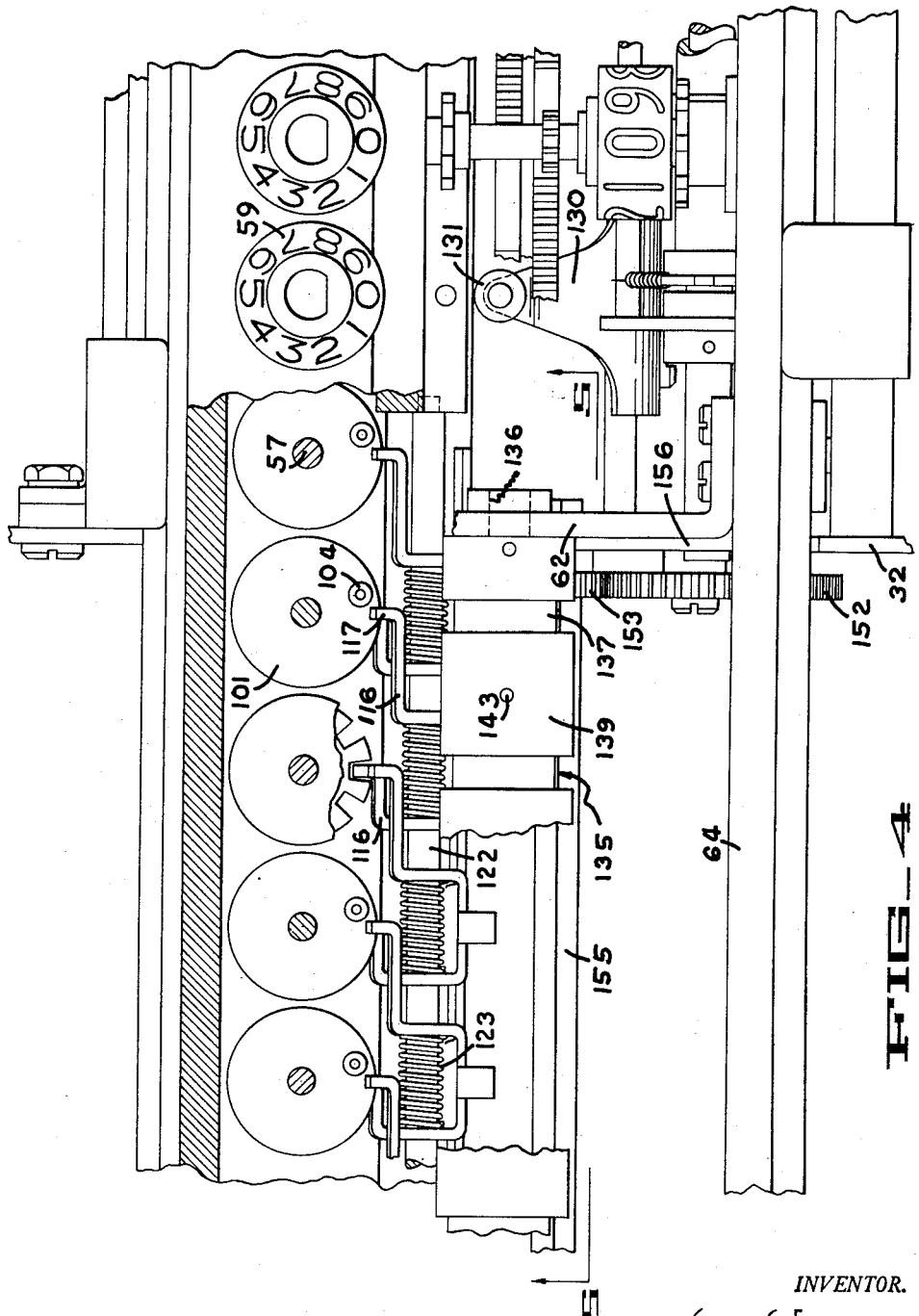
FIG_4
*INVENTOR.*
GRANT C. ELLERBECK
BY 
ATTORNEY May 20, 1952 G. C. ELLERBECK 2,597,463
AUXILIARY TENS-TRANSFER MECHANISM
Filed June 29, 1951 7 Sheets-Sheet 5
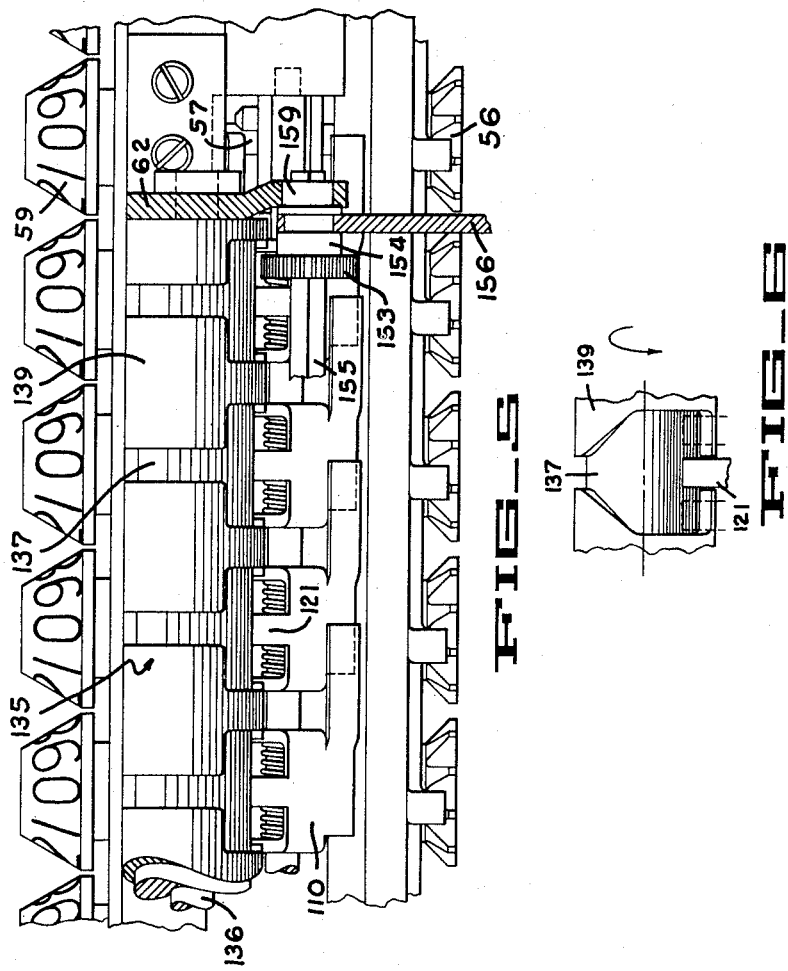
INVENTOR.
GRANT C. ELLERBECK
BY
ATTORNEY

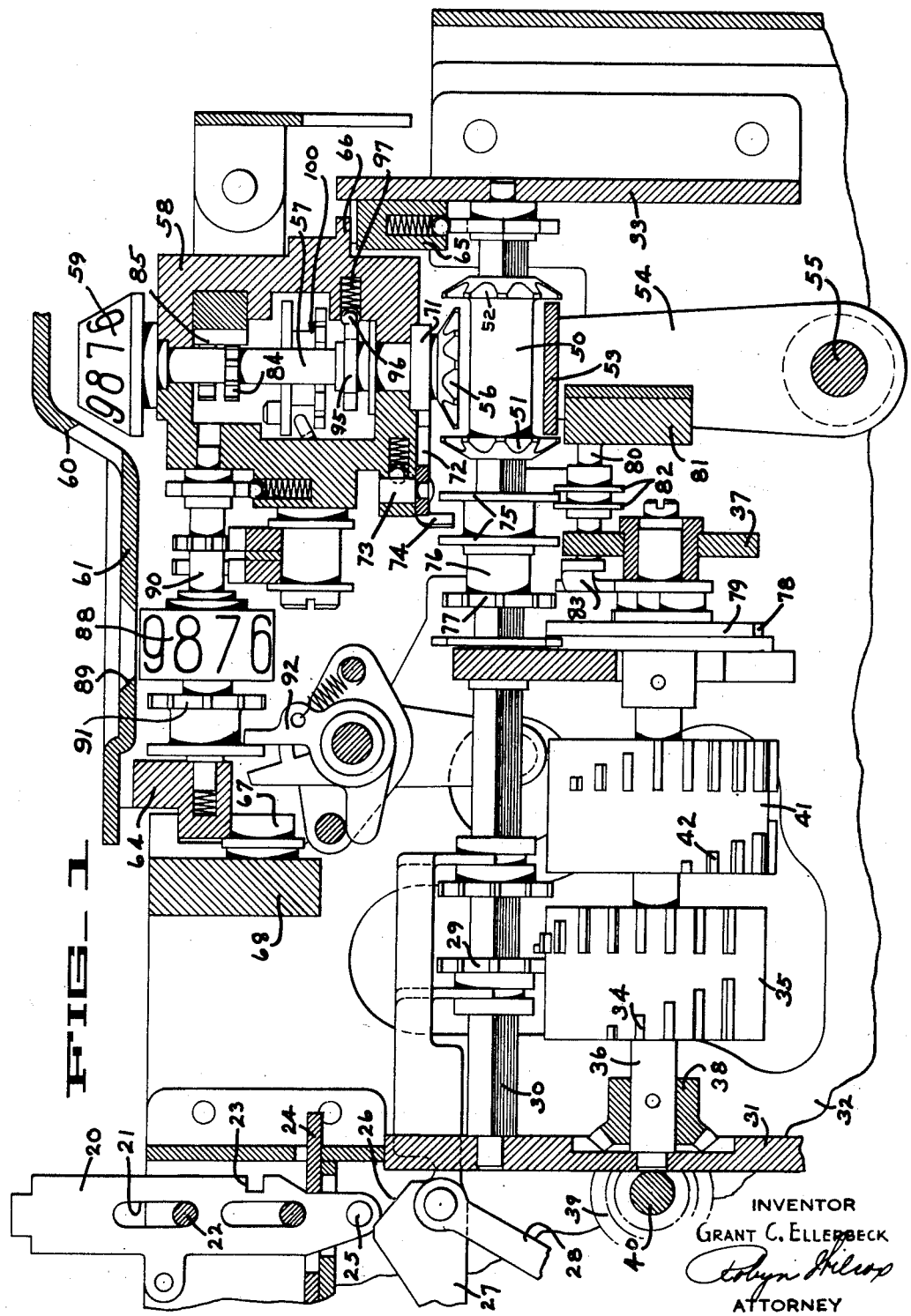

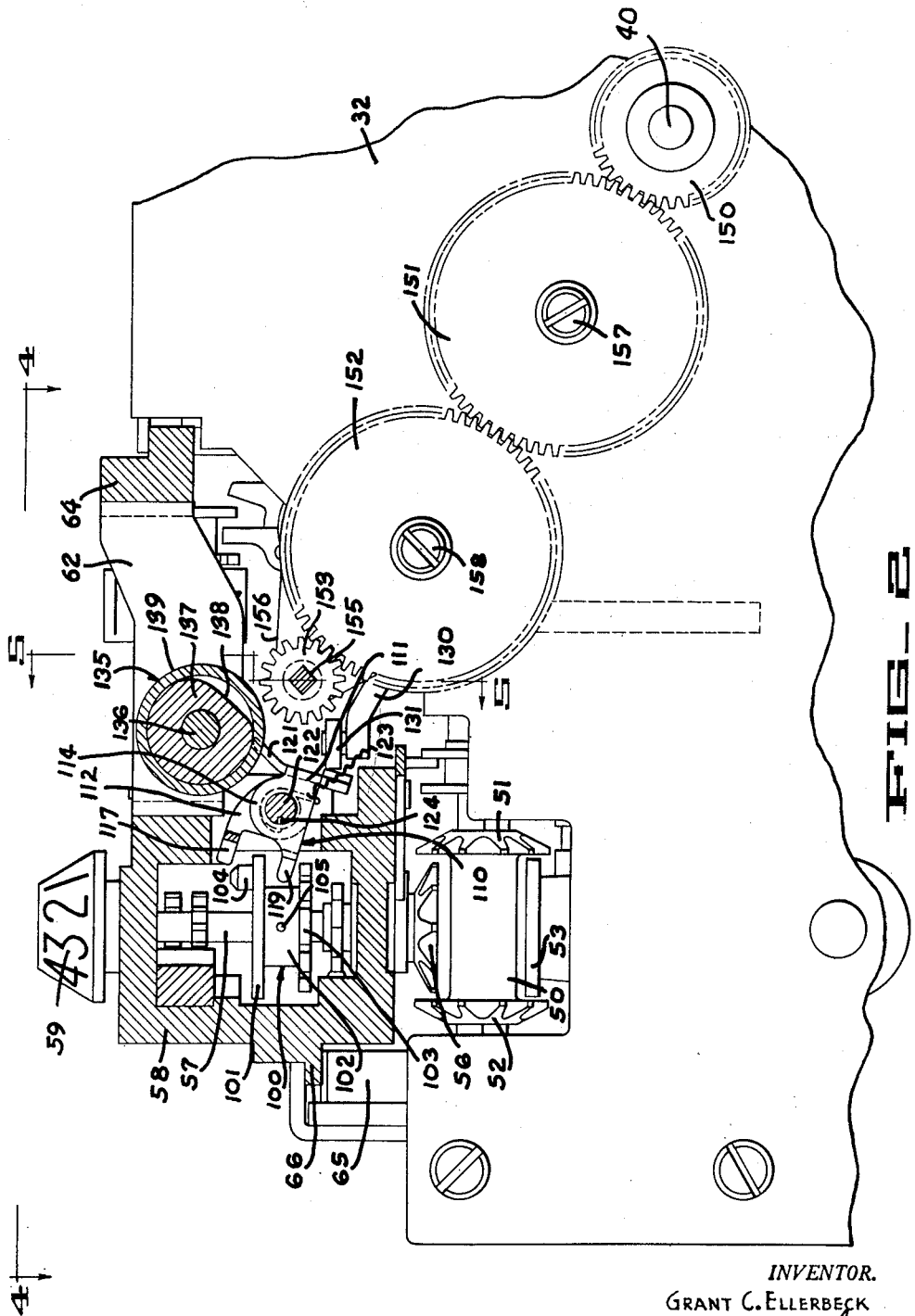

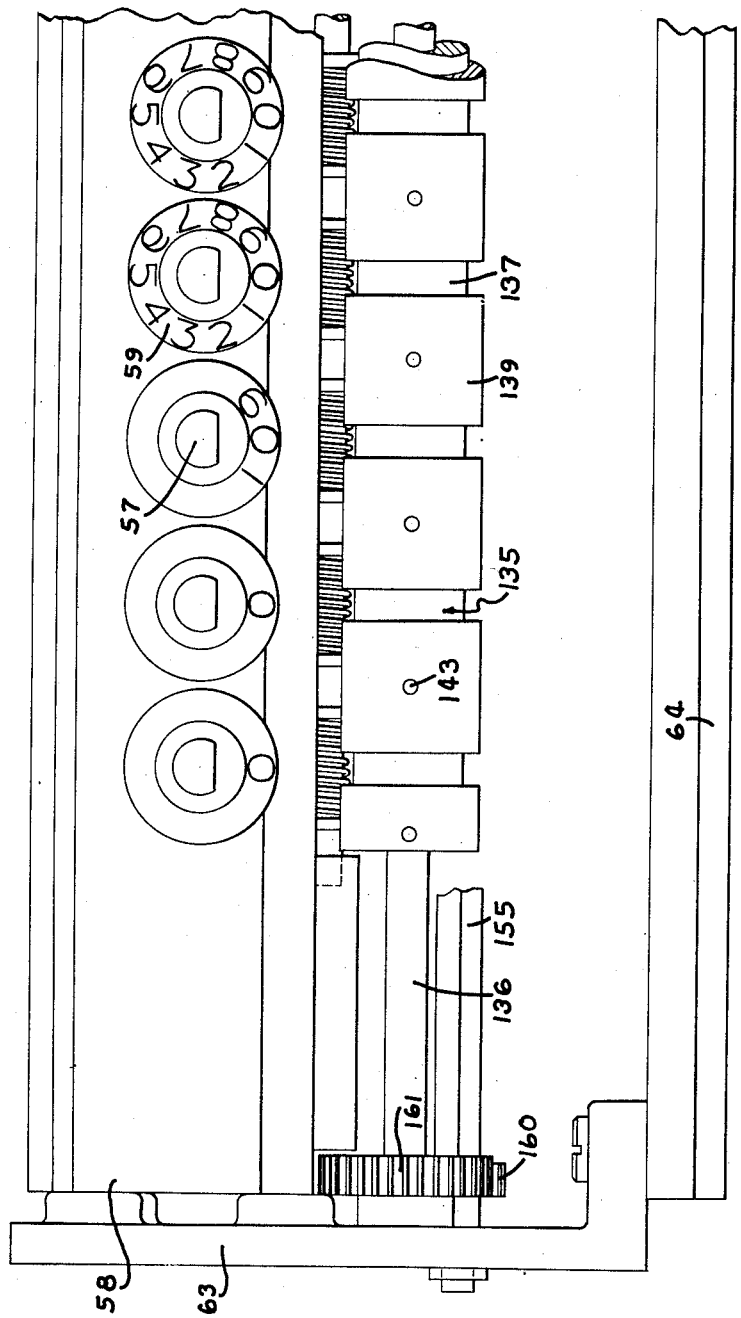

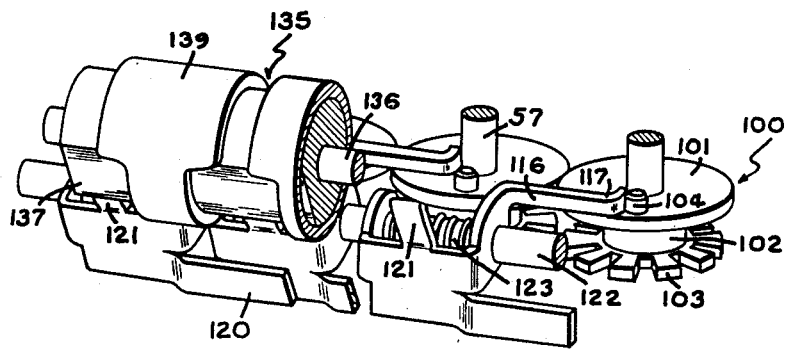
FIG_7
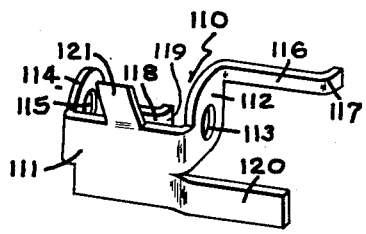
FIG_8

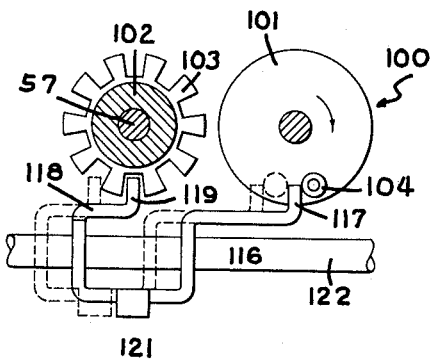
FIG_9
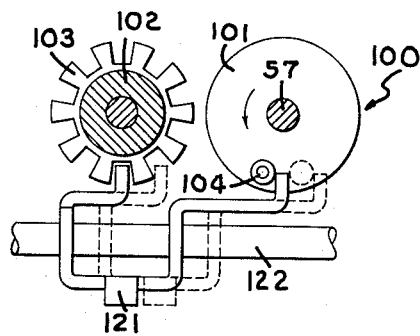
FIG_10
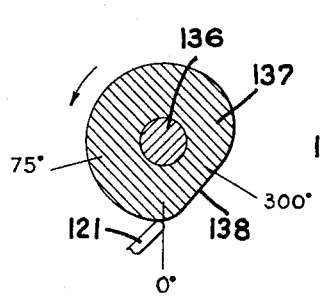
FIG_11
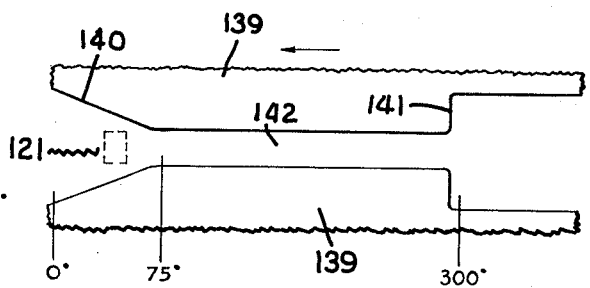
FIG_12
*INVENTOR.*
GRANT C. ELLERBECK
BY
ATTORNEY Patented May 20, 1952

2,597,463

UNITED STATES PATENT OFFICE 2,597,463

AUXILIARY TENS-TRANSFER MECHANISM

Grant C. Ellerbeck, San Leandro, Calif., assignor to Friden Calculating Machine Co., Inc., a corporation of California Application June 29, 1951, Serial No. 234,199

8 Claims. (Cl. 235—137)

This invention relates to calculating machines and, more particularly, to an improvement in the transfer mechanisms for the registers of such machines.

Certain known types of calculating machines are provided with a shiftable register wheel carriage which is of such a length as to project beyond the stationary portion of the machine within which is located the actuating and transfer mechanisms for the register wheels mounted in the carriage. These machines are therefore generally incapable of effecting the carry-over in those wheels which lie beyond the framework of the main body portion of the machine since the transfer mechanism can only cooperate with those register wheels which are located within the confines of the machine proper. Hence, it has been customary on such machines to provide a warning device for notifying the operator that a transfer has been lost during the calculation so that he may rectify the error by putting in an extra unit by hand.

In accordance with the present invention, this deficiency is overcome by providing an auxiliary transfer mechanism in the register wheel carriage which will automatically take care of the necessary transfers in the outboard order wheels of the register. Suitable means is provided for selectively enabling or disabling the individual orders of the auxiliary transfer mechanism as the carriage moves across the machine so that the main transfer mechanism may always operate freely in those orders of the register which lie inboard of the machine, without any interference from the auxiliary transfer mechanism. Means is also provided for disabling the auxiliary transfer mechanism during the digitation phase of an operation cycle—in fact, the auxiliary tens-transfer mechanism is disabled at all times except during that portion of an operative cycle in which the main transfer mechanism is operative to cause a transfer to the higher order in which the main transfer mechanism is effective. Furthermore, the auxiliary transfer mechanism is arranged to be disabled when the machine is in its full cycle position so that the register wheels may be rotated by hand by means of the usual twirler knobs without any interference on the part of the auxiliary transfer mechanism.

Accordingly, it is an object of the present invention to provide an improved transfer mechanism for calculating machines of the type having a shiftable register wheel carriage, whereby the required transfers will be effected in the outboard orders of the register as well as in the inboard orders thereof.

Another object of the invention is to provide an auxiliary transfer mechanism for the outboard orders of the register, this mechanism comprising a series of coupling members for effectively connecting one order of the register with the next higher order thereof for the transfer of a unit each time the lower order wheel passes through zero, together with means for rendering selected ones of said coupling members ineffective as the register wheels move inboard of the machine.

Another object of the invention is to provide an auxiliary transfer mechanism for the outboard orders of the register which is operable in either an additive or a subtractive direction without changing the setting of the mechanism.

Another object of the invention is to provide an auxiliary transfer mechanism for the outboard orders of the register, which mechanism is adapted to be disabled when not needed for a transfer.

Another object of the invention is to provide an auxiliary transfer mechanism which comprises a series of coupling members for operatively connecting one order of the register with the next higher order thereof, said coupling members being so designed that a chain carry can not be lost from the cumulative effect of tolerances permitted in good shop practice.

Other objects and advantages will become apparent from the following description of the preferred embodiment of my invention, as illustrated in the accompanying drawings in which:

Fig. 1 is a fragmentary, longitudinal, sectional view showing the selection, actuating and transfer mechanisms of a well-known type of calculating machine.

Fig. 2 is a left side elevation of the left frame plate of the machine of Fig. 1, showing the auxiliary tens-transfer mechanism largely in cross-section at the full cycle position.

Fig. 3 is a plan view of the left-hand end of the carriage with the cover removed so as to more clearly show the auxiliary transfer mechanism.

Fig. 4 is a plan view of the intermediate section of the carriage (immediately to the right of that shown in Fig. 3) which illustrates further details of the auxiliary transfer mechanism.

Fig. 5 is a front elevation of the intermediate section of the carriage showing other details of the auxiliary transfer mechanism, the view being taken on a vertical plane through the carriage as indicated by the lines 5—5 of Fig. 4.

Fig. 6 is a detail of a carry member and associated cam.

Fig. 7 is an isometric view of a portion of the auxiliary transfer mechanism with some portions broken away to show the arrangement of the parts.

Fig. 8 is an isometric view of the coupling member of the auxiliary transfer mechanism.

Fig. 9 is a plan view of two orders of a register with my auxiliary transfer mechanism, showing the position of the parts when the lower order represents a value of "0" (in full line) and after a subtractive transfer has taken place (in dotted line).

Fig. 10 is similar to Fig. 9 but shows the arrangement of the parts when the lower order represents a value of "9" (in full line) and after an additive transfer has occurred (dotted line).

Fig. 11 is a cross-section view of a control cam for the auxiliary transfer mechanism.

Fig. 12 is a developed view of the cam of Fig. 11.

I show in the accompanying drawings, the preferred form of auxiliary transfer mechanism of my invention, although various modifications will be apparent to those skilled in the art. In the preferred form, transfers are effected in the outboard orders of the register by means of a transfer stud on a disk secured to the shaft of each register wheel, which stud effects the transfer of a unit to the next higher order wheel through a coupling member which receives the impulse from the transfer stud and transmits it to a transfer gear mounted on the shaft of the next higher order register wheel. The transfer of a unit from one order to the next may, in this case, be disabled by rocking the coupling member on its axis so as to move it out of the plane of the transfer stud, whereupon it will no longer be capable of receiving an impulse from the transfer tooth.

In the accompanying drawings, the invention is shown as applied to a calculating machine of the type disclosed in Patent No. 2,229,889, issued to Carl M. Friden on January 28, 1941. In this machine, amounts to be entered into the register wheels are first set up on a keyboard including a plurality of amount keys 20 (Fig. 1) which are mounted for substantially vertical sliding movement in the framework of the machine by means of a pair of elongated slots 21 formed in each key stem, through which pass a pair of through-rods 22 which are supported at either end in the framework of the machine. Each key stem 20 is provided with a notch 23 which cooperates with a latching slide 24 which enters the notch 23 when the key is depressed so as to retain the key depressed against the urgency of a suitable return spring (not shown). Each key stem is provided at its lower end with a stud 25 which lies over an inclined face 26 provided on a selection slide 27 which is mounted for endwise shifting movement in the machine by means of a pair of pivoted links 28 (only one shown). Two selection slides 27 are provided for each row of amount keys, one slide being provided with inclined faces 26 arranged to lie beneath the studs 25 on the "1" to "5" keys, while the other slide 27 is provided with inclined faces 26 lying beneath the studs 25 on the "6" to "9" keys. By varying the angle of inclination of the inclined faces 26, the selection slides 27 may be caused to move forward by differential amounts whenever a key 20 in that particular bank of keys is depressed. At its rear end, each selection slide is operatively connected with a selection gear 29 slidably, but nonrotatably, mounted on a square shaft 30 which is journalled at its forward end in a cross bar 31 extending between the right side frame (not shown) and the left side frame 32 of the machine. At its rear end, the shaft is journalled in a cross bar 33 which, like the bar 31, is supported between the side frames of the machine. Each selection gear 29 is provided with ten teeth and is arranged to cooperate with a series of differentially stepped teeth 34 provided on an actuator drum 35 mounted on an actuator shaft 36 journalled between the cross bar 31 and a cross bar 37 secured to the framework of the machine. Mounted on the forward end of the shaft 36 is a bevel gear 38 which meshes with a similar bevel gear 39 secured to a transverse power shaft 40 journalled between the side frames of the machine.

As fully shown and described in the above-mentioned Patent No. 2,229,889, the calculating machine is provided with an electric motor which is arranged to drive the shaft 40 in a cyclic manner by means of a suitable clutch mechanism. Hence, the actuator shafts 36 will be given cycles of operation and will thereby cause the square shaft 30 to be rotated by the actuator drum 35 through one to nine steps of movement in accordance with the value of the key depressed.

Immediately behind the drum 35 on the shaft 36 is a second actuator drum 41 which, like the drum 35, is provided with a series of differentially stepped teeth 42 which are arranged to cooperate with a second pair of selector gears (not shown) which are settable from a second row of keys (not shown) by means of selector bars (not shown) in a manner similar to that employed in connection with the gears 29. Hence, for each row of keys provided in the keyboard of the machine, there is provided a pair of selector bars, two selector gears, a square shaft 30 and one actuator drum for operating the selector gears. Inasmuch as two actuator drums are provided on each actuator shaft 36, there need be only half as many actuator shafts as there are banks of keys.

Slidably, but nonrotatably, mounted on the rear end of each square shaft 30 is a spool 50 on the forward end of which is mounted a ten-toothed add gear 51 and on the rear end of which is mounted a ten-toothed subtract gear 52. Lying in the space between the gears 51 and 52 is a transverse bail, or gate, 53 which extends across the machine and is supported at either end by arms 54 (only one shown) which are secured to a gate shaft 55 which is journalled between the side frames of the machine. As described in Patent No. 2,229,889, the gate shaft 55 may be rocked either clockwise or counter-clockwise so as to cause either the add gear 51 or the subtract gear 52 to be moved into mesh with a ten-toothed gear 56 which is mounted on the lower end of a register wheel shaft 57 which is journalled in suitable bearings provided in a carriage frame bar 58. On the upper end of each shaft 57 is a numeral wheel 59 which is viewable through an aperture 60 provided in a carriage cover 61.

On either end of the carriage frame bar 58 is secured a carriage end frame 63 (Fig. 3) (only one shown), which end frames are connected together at their forward ends by means of a guide rail 64. The guide rail 64 is also attached to the carriage frame bar 58 by one or more intermediate supporting brackets 62 (Figs. 2 and 4) in order to increase the rigidity of the carriage. The frame bar 58, end frames 63, intermediate brackets 62 and guide rail 64 comprise the main framework of the shiftable register carriage which is arranged for endwise shifting movement on the machine frame. For this purpose, the cross bar 33 (Fig. 1) has secured thereto a bearing rail 65 which lies beneath a lip 66 formed on the frame bar 58 and in this manner serves as a guide and a support for the rear end of the shiftable carriage. The guide rail 64 which extends across the front of the carriage is supported on and guided by a plurality of guide rolls 67 which are rotatably journalled on a cross bar 68 which is fastened at either end to the side frames of the machine. Hence, the carriage and the register wheels may be shifted relative to the spools 50 so as to change the ordinal relationship between the register wheels and the various orders of the actuating mechanism mounted in the framework of the machine. When the gate 53 is in its neutral position, as shown in Fig. 1, ordinal shifting movements of the carriage may be effected without interference on the part of the add-subtract gears 51 and 52, since in this position of the gate, the gears 56 on the lower ends of the register wheel shafts 57 are free to move through the space existing between the add-subtract gears.

Means may be provided, as shown and described in U. S. Patent No. 2,294,083, issued to Carl M. F. Friden on August 25, 1942, for shifting the carriage in either direction from one ordinal position to another by power driven means controlled either by a pair of manually operable shift keys or by certain function control mechanisms which are customarily provided in machines of this character.

Secured to each shaft 57, just above the gear 56, is a transfer cam 71 which cooperates with a transfer lever 72. This lever is pivotally mounted in the frame bar 58 by means of a stud 73 which is secured to the transfer lever and is journalled in a bore provided in the frame bar. Each transfer lever 72 is provided with a formed-over ear 74 which lies between a pair of flanges 75 formed on a hub 76 of a transfer gear 77 which is slidably, but nonrotatably, mounted on the square shaft 30 in the next higher order. The transfer gears 77 are each provided with ten teeth and are each adapted to cooperate with a single tooth 78 formed on a series of transfer actuators 79 mounted on the actuator shafts 36. The transfer gears are yieldably maintained in either their rearward, or inactive positions or in their forward, or active positions by means of detent pins 80 which are slidably mounted in the cross bar 37 and in an auxiliary frame bar 81. Each pin 80 is provided with a pair of flanges 82 which embrace a flange on its associated transfer gear so as to cause the pin 80 to partake of the sliding movements of the transfer gear. The pins 80 are suitably detented in either their forward or rearward positions by means of spring pressed balls (not shown) mounted in the cross bar 81 which are adapted to engage with notches formed in the rear ends of pins 80.

It will be seen from the foregoing description that each time a numeral wheel passes from "9" to "0" or from "0" to "9," the cam 71 will oscillate its associated transfer lever 72 and cause the transfer gear 77 in the next higher order to be moved into the path of the actuator tooth 78 for that order. The gear 77 will be maintained in its forward position by detent pin 80 until after the gear has been rotated one tooth space by the tooth 78, after which the gear will be returned to its rearward, or inactive position by means of a restore cam 83 mounted on the actuator shaft 36. The mechanism just described, consisting of the transfer cams 71, transfer levers 72, transfer gears 77 and transfer actuator teeth 78 comprises what will hereinafter be referred to as the conventional, or main, transfer mechanism of the machine.

Machines of the type presently being described are generally provided with six actuator shafts 36 and twelve square shafts 30 so that the twelfth numeral wheel 59 from the right-hand end of the register is normally the highest order wheel to receive a transfer impulse from the main transfer mechanism when the carriage is in its leftmost, or normal position. Hence, inasmuch as the main transfer mechanism is mounted within the framework of the machine and is contained in the space existing between the right and left side frames of the machine, the first twelve orders of the register may be considered to be the inboard orders thereof when the register carriage is in its leftmost, or normal position, whereas all higher orders of the register may be considered to constitute the outboard orders of the register.

Means is provided for simultaneously resetting all of the numeral wheels 59 to their zero positions and for this purpose each shaft 57 is provided with a mutilated gear 84 which is adapted to cooperate with a resetting rack 85 mounted for longitudinal sliding movement within the frame bar 58. This resetting mechanism is of conventional design and may be similar to that shown and described in Patent No. 2,294,083, supra. As therein described, this mechanism may be either manually operated by means of a resetting knob located at the right-hand end of the carriage or may be operated by power derived from one of the actuator shafts 36.

The accumulator shaft 57 and its associated dial 59 are held in a full line or centralized position by a conventional centralizer. The form preferred, and that described in the aforementioned patents, comprises a star wheel 95 which is engaged by a ball 96, the ball being urged into engagement with the star wheel by a suitable spring 97, as shown. This centralizer mechanism is operable to hold the accumulator dial assembly in the full line position so that the driving gear 56 is always in position to engage the plus or minus gears 51 or 52, and the accumulator dial 59 is always in a full line position with respect to the window 60. Furthermore this centralizer is operative to hold the assembly in the full line position to prevent underthrow or overthrow in the movement of the assembly in the various orders.

For the purpose of registering the number of cycles performed by the machine with the carriage located in any of its various ordinal positions, the shiftable carriage has mounted thereon a plurality of numeral wheels 88 which are viewable through a window 89 provided in the cover 61 of the carriage. Each numeral wheel 88 is mounted on a horizontal shaft 90 which is journalled at its rear end in the frame bar 58 and at its forward end in the guide rail 64. Also mounted on each shaft 90 is an actuator gear 91 which is adapted to be operated by a revolutions counter actuator 92 which is journalled in the framework of the machine and serves to rotate the numeral wheel 88, located in cooperative relationship with the lowest order of the actuator 92, one step on each cycle of operation of the machine and also serves to perform the necessary transferring operations in the higher order wheels 88. This mechanism is of conventional design and reference may be had to Patent No. 2,229,889 for a detailed description thereof.

*Auxiliary transfer mechanism*

In order to extend the transferring of units from one order of the register to the next higher order thereof beyond the twelfth numeral wheel 59, the machine shown in the accompanying drawings is provided with an auxiliary transfer mechanism which enables transfers to be effected throughout the entire capacity of the register.

As shown in Figs. 1 and 2, the register wheel shaft 57 in the twelfth order of the carriage, i. e., the twelfth shaft from the right-hand end of the carriage, has secured thereto an auxiliary transfer mechanism 100. The auxiliary transfer mechanism 100 is best shown in Figs. 2, 7, 9 and 10, and comprises a disk or plate 101, an integral collar 102, and an integral gear member 103. The disk 101 carries a short stud 104, as shown in these figures, preferably mounted near the periphery of the disk. The auxiliary transfer assembly 100 is rigidly secured to the respective shaft 57 by any suitable means, such as pin 105 (shown in Fig. 2). These auxiliary transfer assemblies are operative to transfer a single unit from one order to the next, the transfer being actuated by the stud 104 in the lower order and being received by the gear 103 in the next higher order. Associated with the transfer units of each adjacent order, and adapted to cooperate with them is a connecting member 110 operative to move the higher order gear 103 upon the rotation of the stud 104 of the lower order between the "9" and "0" positions.

The connecting member just mentioned is shown in detail in Fig. 8, and is shown assembled in the mechanism in Figs. 2, 4 and 7. The connector member 110 comprises a bail 111 having integral arms 112 and 114 extending at right angles therefrom. The two arms 112 and 114 are provided with aligned apertures 113 and 115 adapted to receive the transverse shaft 122 (shown in Fig. 7). Integral with the mounting arm 112 is an extension 116 lying in a plane parallel to the axis of the shaft 122. This extension has a turned-over ear 117 which lies intermediate the "0" and "9" positions of the stud 104, as is shown in full lines in Figs. 9 and 10. As shown in the two figures just mentioned, the ear 117 extends to a position where it will engage the stud 104 when rocked counterclockwise from the position shown in Fig. 2 so as to lie in the plane of the stud. The other arm 114 of the connecting member is likewise provided with an extension 118, in the preferred embodiment also lying parallel to the shaft 122. The extension 118 is also provided with a turned-over ear 119 so positioned as to lie, when the connector 110 is in its normal inoperative position, in the space between adjacent teeth on the gear 103 (see Figs. 9 and 10).

The connectors 110 normally lie in the clockwise position shown in Fig. 2 so that the ears 117 and 119 are rocked out of the plane of the stud 104 and the teeth of the gear 103, respectively. At the phase of each operating cycle utilized for the tens-transfer to and through the 12th order of the machine, the connectors are rocked counter-clockwise from the position shown in Fig. 2, so that the ear 117 lies in front of the stud 104 on the lower order and the ear 119 will lie between adjacent teeth on the gear 103 of the higher order. In this position of the connector 111, rotation of the lower order dial shaft between the "0" and "9" positions, either additively or subtractively, operates to translate the connecting member 110 along the shaft 122, thereby imparting a single step of rotation to the gear 103—thereby effecting a transfer of one to the higher order shaft 57. As mentioned, this transfer can be either additive as shown in Fig. 10 or subtractive as is shown in Fig. 9. It can also be mentioned that preferably the stud 104 will lie at the periphery of the disk 101 and that the ear 119 be adapted to engage the inner recess of the space between adjacent gear teeth on the gear 103. By this means the connecting member 110 is given a slight overthrow, insofar as the gear 103 of the higher order is concerned, because it receives its translatory movement from the stud 104 lying radially outside of the inner part of the space between the adjacent gear teeth. This is done to prevent loss of a transfer through a number of orders, as each accumulator shaft 57 is detented to a full digital position by the detents previously mentioned. A chain transfer will be effective to carry across all the outboard orders—it will not become lost from an accumulation of allowable variations in dimensions of parts.

The connecting members 110 are also provided with an offset tail 120 extending to the right, whereby the clockwise rocking of the connecting member in any order will be operative to similarly rock all connectors to the right thereof to the clockwise position, shown in Fig. 2. This tail 120 is used to disengage all of the connectors 110 lying to the right of the lowest outboard order. Thus, as the carriage is shifted inboard the connectors are progressively rendered inoperative by the rocking of the connector 110 lying to the immediate right of the highest inboard order, as will now be explained.

Mounted on the left side frame 32 (Figs. 2 and 4) is a short bracket 130, on which a roller 131 is rotatably mounted. The roller 131 lies in the plane of the tails 120, so that the shifting of the carriage to the right causes the tails 120 to progressively engage the roller 131 whereupon the particular connector 110 is held in the extreme disengaged position, shown in Fig. 2. As mentioned before, this disables all of the connectors lying to the right thereof. Thus, as the carriage is shifted to the right the auxiliary transfer members of the outboard orders are disabled so that the normal tens-transfer mechanism can operate on all of the inboard orders.

The connectors 110 are normally urged to the counterclockwise position (i. e., in which the ears 117 and 119 lie in the planes of their associated studs 104 and gear 103, respectively) by means of a torsion spring 123. The torsion spring, as shown in Fig. 2, has one end inserted in a slot 124 in the shaft 122 and the other end hooked over the arm 114. Thus, the connectors are normally urged to the position in which they engage the respective auxiliary transfer units and are normally held in the disengaged or clockwise position shown in Fig. 2, by a compound cam now to be described.

The compound cam 135 is mounted on a transverse shaft 136 journalled in the carriage between the center bracket 62 and the left-end frame 63. This shaft 136 is driven in synchronism with the main drive shaft 40. It will be understood that the compound cam 135 could be an integral cam member but it is preferred that it be a unit composed of several elements for ease in construction and assembly. In the preferred form the cam 135 is composed of a cam cylinder 137 extending the entire length of the outboard orders—that is, between the intermediate bracket 62 (Fig. 4) and the left end frame 63. This cylindrical cam member is shown in cross-section in Figs. 2 and 11. It is generally cylindrical in shape, being flattened as shown from approximately the 270° position to the "0" position. In the machine of the patents above referred to, this cam would always rotate in a counter-clockwise direction, the zero degree position being the full-cycle position which this cam will assume at the end of every cycle of operation. Therefore, the cam will be of substantially equal radius for approximately 270° and will then be flattened for approximately 90°. The tail 121 of the connecting members 110 extends upwardly to engage this cam 137, as shown in Figs. 2, 5, 7 and 11. Thus, the connecting member 110 will be held in the clockwise position shown in Fig. 2 for approximately three-fourths of the cycle of operation, and then the flat portion 138 will permit the connecting member 110 to rock counter-clockwise to enable the ears 117 and 119 to rock into the planes of the stud 104 and the gear 103. The cam 137 is therefore operative to hold the connecting member 110 in a disengaged position throughout the major portion of the cycle of operation and to permit the member to become aligned with the tens-transfer units 100 in timed relation with digitation and transfer in the highest inboard order of the machine (in the machines above-mentioned, the 12th order).

A plurality of cam sleeves 139 are pinned to the cam 137, by any suitable means, such as pin 143 (Fig. 4). The cam sleeves 139 are shaped as shown in Fig. 12, and are separated one from another as shown in the same figure. Beginning at the "0" position, the first 75° are angularly disposed with the circumferential axis of the sleeve, so that the tail 121 is positively moved to the central disengaged position, in which it is held for the portion of the cycle between 75° and 300°. At approximately 300° the cams are cut away abruptly, as at 141, whereby the tail 121 can be sharply moved during the auxiliary tens-transfer. By this means the connecting members 110, by virtue of the tail 121 engaging the angularly disposed peripheral portion 140 are brought to the central position in which the two ears 117 and 119 lie in the space between the "0" and "9" positions of the stud 104, and are held in that position until just before the auxiliary tens-transfer occurs. If a tens-transfer occurs, the tail 121 can be moved in either an additive or a subtractive direction by virtue of the shoulder 141 permitting lateral movement. If, on the other hand, the tens-transfer does not occur, the tail 121 will remain in its normal position and will enter the straight slot 142 between adjacent sleeves without further movement.

The drive for the compound cam 135 is shown particularly in Figs. 2, 3, 4 and 5. As shown in Fig. 2, the drive shaft 40 carries a gear, or pinion, 150 on its left end. Meshing with the pinion 150 is an idler gear 151 which in turn drives a second idler gear 152, the two idler gears being suitably mounted on screws 157 and 158 affixed to the left frame plate 32. The second idler 152 meshes with a pinion 153. The pinion 153 is formed with an integral grooved collar 154, the groove being embraced by a bracket extension 156 of the frame plate 32 (see Fig. 5). The collar and pinion are thus journalled in the bracket extension 156 and are held in spaced relationship with the frame plate 32 at all times.

The pinion 153 and integral collar 154 are also mounted on a square shaft 155 journalled in the carriage. The drive shaft 155 is thus driven by pinion 153, and is also movable with the carriage. Thus, the shifting of the carriage will shift the shaft but the driving pinion 153, therefore, will at all times remain enmeshed with its driving train of gears. The right end of the square shaft 155 is mounted in a bearing or collar member 159 carried by a lower extension of the intermediate bracket 62 (as shown in Fig. 5).

The left end of the square shaft 155 is journalled in a suitable bearing in the carriage left end plate 63, as shown in Fig. 3. Adjacent to plate 63 a small pinion 160 is mounted on the square shaft 155. The pinion 160 meshes with a similar pinion 161 mounted on the shaft 136 which carries the compound cams 135. By this means the cams 135 are driven in synchronism with the other elements of the machine. The gear trains should be such as to permit the driving of the cam in any carriage position and to rotate the compound cams 135 a complete cycle for each complete cycle of operation of the machine, i. e., the drive shaft 40.

*Operation*

It is believed that the operation of the full carry-over, or auxiliary transfer, mechanism of my invention will be understood from the preceding description. However, it can be briefly summarized as follows: The digitation and normal tens-transfer mechanism mounted in the frame of the machine will operate in the manner described in the previously mentioned patents. In machines of this kind, it is customary to have twelve orders, or register dials, inboard and the remainder outboard of the machine. The first twelve dials thus will receive their digitation and transfer impulses in the conventional manner. The outboard dials will of course receive no digitation impulses, but by means of my invention can receive transfer impulses the full width of the outboard orders. During most of the digitation phase of the machine (from 0 to approximately 270°) the connecting members 110 are rocked to their disengaged position by the compound cams 135. At approximately the 270° position the cam is flattened to permit the connected members 210 to rock into alignment with the auxiliary tens-transfer unit 100. This rocking of the transfer members into alignment with the tens-transfer units, is timed to coincide with the phase of the operation cycle in which the last inboard order may receive impulses from the normal operating mechanism. In Fig. 5, the first full dial on the right would be the last inboard order, and all of the dials to the left thereof would have their connecting members kept in disengagement until the operative phase of the operative cycle in which the highest inboard order would receive an impulse. Then the connectors are rocked into alignment so that if a tens-transfer is called for it can be received by the outboard order dials.

The tens-transfers are actuated by the studs 104 on the auxiliary transfer units. It will be understood that the highest inboard order will have such a transfer unit so that a transfer impulse can be imparted to the connecting member 110 by the stud 104 thereon. If the stud is in the position shown in Figs. 9 and 10, and digitation or a transfer in the 12th order calls for a transfer to the 13th order, the rotation of the highest inboard order dial through the "9" to "0" position will cause a transfer to be imparted to the gear 103 in the next higher order.

This transfer can be a "chain" transfer. That is, one extending clear across the outboard orders of the keyboard. This is due to the fact that although the parts do not have to be machined to close accuracy, it is impossible for a transfer to be lost through play between the related assemblies. This result is secured by driving the connecting member from a stud on the periphery of the plate 101 and imparting it to a radially inside position to the gear 103 of the next higher order. This slight overthrow permits play between adjacent transfer units and their associated connecting members without permitting such a transfer to be lost. On the other hand there is no danger of an overthrow to carry a value of more than one in any of the outboard orders as inertia and the centralizers prevent such a possibility.

Therefore, by the mechanism of my invention I am able to provide an accurate and efficient auxiliary tens-transfer, operative from power in the inboard order to drive as many outboard orders as may be desired, positively and accurately.

I claim:

1. In a calculating machine having a frame, a carriage mounted for endwise shifting movement on said frame, and a plurality of ordinally arranged register wheels journalled in said carriage, certain of said wheels lying inboard of said frame and others of said wheels lying outboard thereof when said carriage is in its end position; the combination of a main transfer mechanism situated within said frame for effecting transfers in the inboard register wheels and an auxiliary transfer mechanism mounted on said carriage for effecting transfers in the outboard register wheels, said last-named mechanism comprising a transfer drive member mounted for movement with the highest order inboard wheel, a transfer gear and a transfer drive member mounted for movement with each of the outboard register wheels, and a series of slidable and rockable connecting members for operatively connecting each transfer drive member with the transfer gear in the next higher order of the register so as to enable the transfer of a unit from one order to the next to be effected throughout the entire array of register wheels, cam means controlling rocking of said connecting members to normally rock them to an inoperative position with respect to their respective transfer drive members and transfer gears, and to rock said connecting members into an operative position with respect to said drive members and gears in timed relation to operation of the highest order inboard register wheel, and means mounted on said frame for holding any connecting member shifted inboard in its inoperative position.

2. A calculating machine having a frame, a carriage mounted for endwise shifting movement on said frame, a plurality of ordinally arranged register wheels journalled in said carriage, certain of said wheels lying inboard of said frame and others of said wheels lying outboard thereof when the carriage is in its end position, and a main transfer mechanism situated within said frame for effecting the necessary transfers in the inboard register wheels, an auxiliary transfer mechanism for effecting the necessary transfers in the outboard register wheels comprising a transfer drive member mounted on the highest order inboard wheel, a transfer gear and a transfer drive member mounted on each of the outboard wheels, a series of coupling members rockably and slidably mounted in said carriage for operatively connecting each transfer drive member with the transfer gear in the next higher order so as to enable a unit to be transferred from one order of the register to the next throughout the entire array of register wheels, cam means normally rocking said coupling members to a position out of alignment with said drive members and gears and operative in timed relation to the operation of the highest inboard order register wheel to rock said coupling members into alignment with said drive members and said gears, and means for holding all coupling members lying inboard of said frame in the non-aligned position.

3. A calculating machine as defined in claim 2 comprising also cam means normally holding said connecting members in a centralized intermediate ordinal position and operative in timed relation to the operation of the highest inboard order register dial to permit longitudinal displacement of said member in either ordinal direction.

4. In a calculating machine having a frame, a carriage mounted for endwise shifting movement on said frame, a plurality of ordinally arranged register wheel shafts journalled in said carriage, certain of said shafts lying inboard of said frame and others of said shafts lying outboard thereof when the carriage is in its end position, a register wheel mounted on each such shaft, and a main transfer mechanism situated within said frame for effecting transfers in the inboard register wheels, an auxiliary transfer mechanism mounted in said carriage for effecting transfers in the outboard register wheels comprising an impelling projection mounted on the highest inboard order shaft, a transfer gear and impelling projection assembly mounted on the outboard register wheels, a series of connecting members mounted in said carriage for operatively connecting each stud with the transfer gear in the next higher order of the register, means for rocking said connecting members into alignment with their respective studs and gears, means including a cam for rocking said connecting members out of alignment with their respective studs and gears so as to disable the transfer of a unit from one order of the outboard register wheels to the next, means for driving said cam in synchronism with said main transfer mechanism, and means for rocking said connecting members out of alignment with their respective studs and gears as said members are shifted inboard by movement of said carriage.

5. The apparatus of claim 4 wherein the cam is a compound cam effective also to centralize said connecting members in an ordinally intermediate position during that portion of an operative cycle in which the connecting members are out of alignment with their respective studs and gears, and to permit displacement of said members in either ordinal direction during that portion of the operative cycle in which said members are in alignment with their respective studs and gears.

6. The apparatus of claim 4 wherein the stud lies at a greater radial distance from the shaft on which it is mounted than the root diameter of the gear, and the connecting member engages the root of the gear teeth, whereby each transfer in an outboard order causes the connecting member to move the gear slightly more than one unit space.

7. In a calculating machine having a frame, a carriage mounted for endwise shifting movement on said frame, a plurality of ordinally arranged register wheel shafts journalled in said carriage, a register wheel mounted on each such shaft, certain of said shafts and wheels lying inboard of said frame and others of said shafts and wheels lying outboard thereof when the carriage is in its end position, and a main transfer mechanism situated within said frame for effecting transfers in the inboard register wheels, an auxiliary transfer mechanism mounted in said carriage for effecting transfers in the outboard register wheels comprising a plate mounted on the highest inboard order shaft, a stud mounted on said plate, a transfer gear, plate and stud assembly mounted on each of the outboard register wheels, a series of slidable and rockable interponents mounted in said carriage positionable in an aligned position wherein it engages the gear of the next higher order and is engageable by the stud of the next lower order and in a nonaligned position wherein it lies out of the planes of said gear and stud, means for rocking said interponents into alignment with their respective gears and studs, means including a compound cam operative to rock said interponents out of alignment with their respective gears and studs and also to centralize said interponents in an ordinally intermediate position during a major portion of an operation cycle and to rock said interponent into alignment with their respective gears and studs and to release said interponent for shifting in either ordinal direction during another portion of an operation cycle, means for driving said cam in synchronism with said main transfer mechanism, and means for rocking said connecting members out of alignment with their respective studs and gears as said members are shifted inboard by movement of said carriage.

8. In a calculating machine having a frame, a carriage mounted for endwise shifting movement on the said frame, and a series of numeral wheels in the said carriage, certain of said numeral wheels lying inboard of said frame and others of said wheels lying outboard thereof, and a reversible normal tens-transfer mechanism for the inboard orders of the said carriage, a reversible auxiliary tens-transfer mechanism for said outboard orders comprising a plurality of ordinally arranged rockable and slidable transfer members lying between the highest inboard and lowest outboard numeral wheels and between the outboard order wheels, means mounted on the highest inboard and the outboard order wheels to engage the transfer member lying intermediate such wheel and the next higher wheel to impart lateral sliding movement to said transfer member as such wheels pass through the "9" to "0" position, means mounted on each outboard order wheel for engaging the transfer member lying between such last-mentioned wheel and the next lower order wheel, whereby a transfer member may be shifted by the numeral wheel at its ordinally lower end and is operative to rotate the numeral wheel at its ordinally higher end, means for rocking said transfer members into alignment with both said means mounted on said wheels, and means including a cam for rocking said transfer members out of alignment with said numeral wheels during a predetermined portion of each operation cycle.

GRANT C. ELLERBECK.

No references cited.